United States Patent

Peigney et al.

[11] Patent Number: 5,428,198
[45] Date of Patent: Jun. 27, 1995

[54] METHOD AND DEVICE FOR THE ORBITAL WELDING OF A CYLINDRICAL PART ONTO A CURVED WALL

[75] Inventors: Alain Peigney, St Loup de Varennes; Pascal Latreille, St Germain Du Plain; Michel Batistoni, Le Bourg, all of France

[73] Assignee: Framatome, Courbevoie, France

[21] Appl. No.: 188,815

[22] Filed: Jan. 31, 1994

[30] Foreign Application Priority Data

Jan. 29, 1993 [FR] France .................. 93 00980

[51] Int. Cl.6 .................. B23K 9/12
[52] U.S. Cl. .................. 219/61; 219/125.11
[58] Field of Search .................. 219/60 A, 61, 125.11

[56] References Cited

U.S. PATENT DOCUMENTS

| | | | |
|---|---|---|---|
| 2,927,195 | 3/1960 | Arnaud | 219/125.11 |
| 4,629,853 | 12/1986 | Yttergren et al. | 219/60 A |
| 5,254,835 | 10/1993 | Dalke et al. | 219/125.11 |

FOREIGN PATENT DOCUMENTS

| | | |
|---|---|---|
| 433179 | 6/1991 | European Pat. Off. . |
| 1627564 | 1/1971 | Germany . |
| 2228970 | 12/1978 | Germany . |
| 3715521 | 8/1988 | Germany . |

Primary Examiner—Clifford C. Shaw
Attorney, Agent, or Firm—Pollock, Vande Sande & Priddy

[57] ABSTRACT

The welding electrode rotates at variable speed about the axis of the cylindrical part so as to lay down successive superposed layers, each covering the entire width of the bevel. The electrode is moved translationally in the direction of the axis of the cylindrical part. The device includes arrangements for adjusting the speed of rotation of the electrode and for moving it in the direction of the axis. The method may be used for welding a replacement adaptor onto the vessel head of a nuclear reactor.

5 Claims, 4 Drawing Sheets

METHOD AND DEVICE FOR THE ORBITAL WELDING OF A CYLINDRICAL PART ONTO A CURVED WALL

FIELD OF THE INVENTION

The invention relates to a method of orbital welding of a cylindrical part onto a curved wall and, in particular, to a method of welding an adaptor for penetrating the vessel head of a pressurized water nuclear reactor, during the replacement of a defective adaptor.

BACKGROUND OF THE INVENTION

Pressured-water nuclear reactors include a vessel containing the reactor core which is submerged in the pressurized water for cooling the reactor.

The reactor vessel, of generally cylindrical shape, includes a hemispherical head which may be attached to its upper portion. The head is pierced with openings in the region of each of which is fixed, by welding, in a vertical position, a tubular penetration part constituting an adaptor providing for the passage of a follower of a rod for controlling the reactivity of the core or of a means of measurement inside the core, such as a thermocouple column.

Each of the tubular penetration parts is engaged in an opening penetrating the vessel head and is welded onto the concave lower surface of the head, by an annular weld.

The adaptor is welded onto the vessel head by an orbital welding technique, using a GTAW welding head which includes an electrode and means for feeding a metal filler wire into the region of the electrode. The welding head is moved rotationally about the axis of the penetration and enables the filler metal to be laid down in the form of successive weld beads, inside an annular bevel which surrounds the penetration part and is made, at least partially, inside the head in the region of the penetration opening.

In general, the annulus-shaped welding bevel, which has as axis the axis of the penetration, has a meridional cross-section which widens out from the bottom of the bevel inside the head as far as the outer end of the bevel in the region of the concave surface of the head.

The width of the bevel, even at its narrowest portion, is generally greater than the width of a weld bead made of filler metal which may be laid down by the welding head, during a rotation about the axis of the penetration.

It is therefore necessary to fill in the bevel by juxtaposing, according to the width of the bevel, weld beads which are formed during successive passes.

The weld beads, juxtaposed according to the width of the bevel, constitute a layer which is formed in a plurality of successive passes during each of which the welding head carries out one complete revolution in rotation about the axis of the penetration.

The successive layers of filler metal, constituted by juxtaposed weld beads, are themselves superposed, so as to fill in the entire bevel. The welding of an adaptor, which requires numerous successive orbital-welding passes, is therefore generally a lengthy operation during which a significant volume of filler metal is laid down.

Furthermore, the position of the electrodes and, in particular, their orientation inside the bevel, must be adjusted during each of the successive passes in order to obtain optimum welding conditions. At the same time, the filler wire must be fed into the weld zone with an orientation and in a position which are both variable.

Because of the significant mass of filler metal laid down, large deformations may occur in the region of the penetration.

Furthermore, in the case of a spherical vessel head, the welding is performed over the lower concave surface of the head, so that the adaptors, which are distributed over the spherical-cap-shaped surface of the head and the axis of which has a constant direction which is the vertical direction, have bevels for connecting to the curved surface of the head, the shape of which is complex.

Because it is also necessary to perform at least some welding passes in positions of electrodes which are inclined in relation to the axis of the penetration, the adjustment of the position and of the inclination of the electrode may turn out to be extremely complicated, if not impossible.

In order to overcome these drawbacks, a new type of orbital GTAW welding, generally designated as a narrow-bevel welding method, has been developed. According to this method, the width of the bevel is reduced to a minimum so as to permit the bevel to be filled in by superposed layers each constituted by a single weld bead formed during a single pass.

As a result, the volume of metal laid down is significantly reduced, as are the deformations and residual stresses in the region of the weld zone. Furthermore, the welding time is significantly shorter, which enables the time necessary for manufacturing the vessel head to be significantly decreased.

Another major advantage of the narrow-bevel welding method is that the electrode has a substantially constant inclination from one pass to another, the electrode being able to be placed in a direction substantially parallel to the axis of the penetration.

However, the narrow-bevel welding method is not particularly suited to the case of welding adaptors at any point on the surface of a spherical-cap-shaped vessel head, even if the adjustment of the position and of the inclination of the orbital welding electrode is much easier than in the case of conventional wide-bevel welding.

In fact the surface of the bottom of the bevel, or of the successive layers laid down on the bottom of the bevel, has a complicated geometrical shape for all the adaptors, with the exception of the adaptor located at the central portion of the head, at the top of the spherical cap.

The bottoms of the bevels, or the successive welding layers, have the shape of skewed surfaces which may be considerably inclined in relation to a horizontal plane.

The usual kinetics for moving the orbital-welding electrodes do not assure satisfactory welding conditions, i.e., a constant distance between the end of the electrode and the bottom of the bevel to be covered and a speed of welding, by laying down filler metal, which is constant.

This difficulty occurs not only in the case of adaptors for penetrating a vessel head but also in the case of orbital welding of any cylindrical part onto a curved wall in the region of an opening penetrating the wall, when the axis of the penetration does not pass through the center of curvature of the wall.

SUMMARY OF THE INVENTION

The object of the invention is therefore to provide a method of orbital welding of a cylindrical part onto a curved wall, in the region of an opening penetrating the wall in which the cylindrical part is engaged, by laying down metal obtained by melting of a metal filler wire, with the aid of an electrode, in a bevel surrounding the cylindrical part, in the region of the penetration opening of the wall, the electrode and the metal filler wire moving during the welding in rotation about the axis of the cylindrical part, so as to laydown successive superposed layers each covering the entire width of the bevel, this method enabling the cylindrical part to be satisfactorily welded, even in the case where the axis of this part does not pass through the center of curvature of the wall.

To achieve this object, during the welding, during each of the rotations of a complete revolution of the electrode and of the filler wire about the axis of the cylindrical part, the speed of rotation of the electrode and the speed of rotation of the filler wire about the axis of the cylindrical part are varied in order to obtain a constant linear welding speed, the electrode and the filler wire are moved translationally in the direction of the axis of the cylindrical part, the electrode being constantly positioned in a direction parallel to the axis of the cylindrical part.

BRIEF DESCRIPTION OF THE DRAWINGS

In order to aid in understanding of the invention, a description will now be given, by way of example, with reference to the attached drawings of the implementation of the method according to the invention for welding a penetration adaptor of a vessel head onto the concave inner surface of this head.

DETAILED DESCRIPTION

Figure 1:
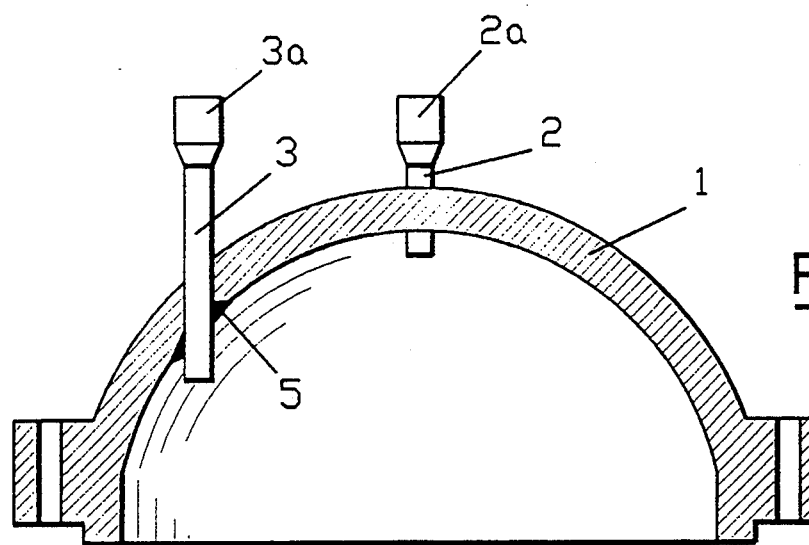
FIG. 1 is a schematic front section view, through a vertical plane of a vessel head and of two adaptors for this head.

FIG. 1 shows a head 1 of a pressurized-water nuclear-reactor vessel, having the shape of a spherical cap which is penetrated by openings in which tubular penetration parts, such as 2 and 3, called adaptors, are fixed.

The adaptors, include a tubular portion engaged and fixed in an opening penetrating the head 1 and a widened end portion 2a or 3a onto which a mechanism is fixed enabling the follower of a control rod penetrating the head to be moved inside the adaptor 3.

During the construction of the vessel head, after forming and machining the head which is pierced with a plurality of openings which allow passage of the adaptors, the adaptors are inserted into the openings and the adaptors are fixed onto the vessel head and the passage for these adaptors in the openings of the head are sealed by forming annular weld beads.

The welding operation consists in laying down a filler metal in an annular bevel surrounding the adaptor, in the thickness of the vessel head. The vessel head and, possibly, the adaptor are machined so as to obtain a bevel of desired shape.

The adaptor 2, located at the top of the head 1, on the axis of this head, is fixed by a weld laid down inside a bevel, which is coaxial with the head. This arrangement of the bevel of the adaptor 2 enables the weld to be formed automatically, by orbital welding, using a welding head driven in rotation about the axis of the head.

As explained hereinabove, the weld is formed by laying down successive weld beads superposed in the bevel.

In the case of an adaptor such as the adaptor 3, arranged in a non-central portion of the head, the bevel has a complicated shape and an inclination which may be steep in relation to a horizontal plane.

After the vessel head has been used for a certain time, the adaptors are inspected in order to detect possible cracks on their inner surface, in particular in the weld zone. In the case where cracks are detected, it may be necessary to carry out repairs, or even to replace the adaptor by a new adaptor. In the latter case, the weld joining the adaptor to the head is machined in order to remove the defective adaptor and a new adaptor is placed in the opening of the head. An adaptor-joining weld is formed, the head being placed in its position represented in FIG. 1.

The weld has to be formed on a surface facing downwards, this type of welding being generally known in the art as "overhead welding".

Figure 2:
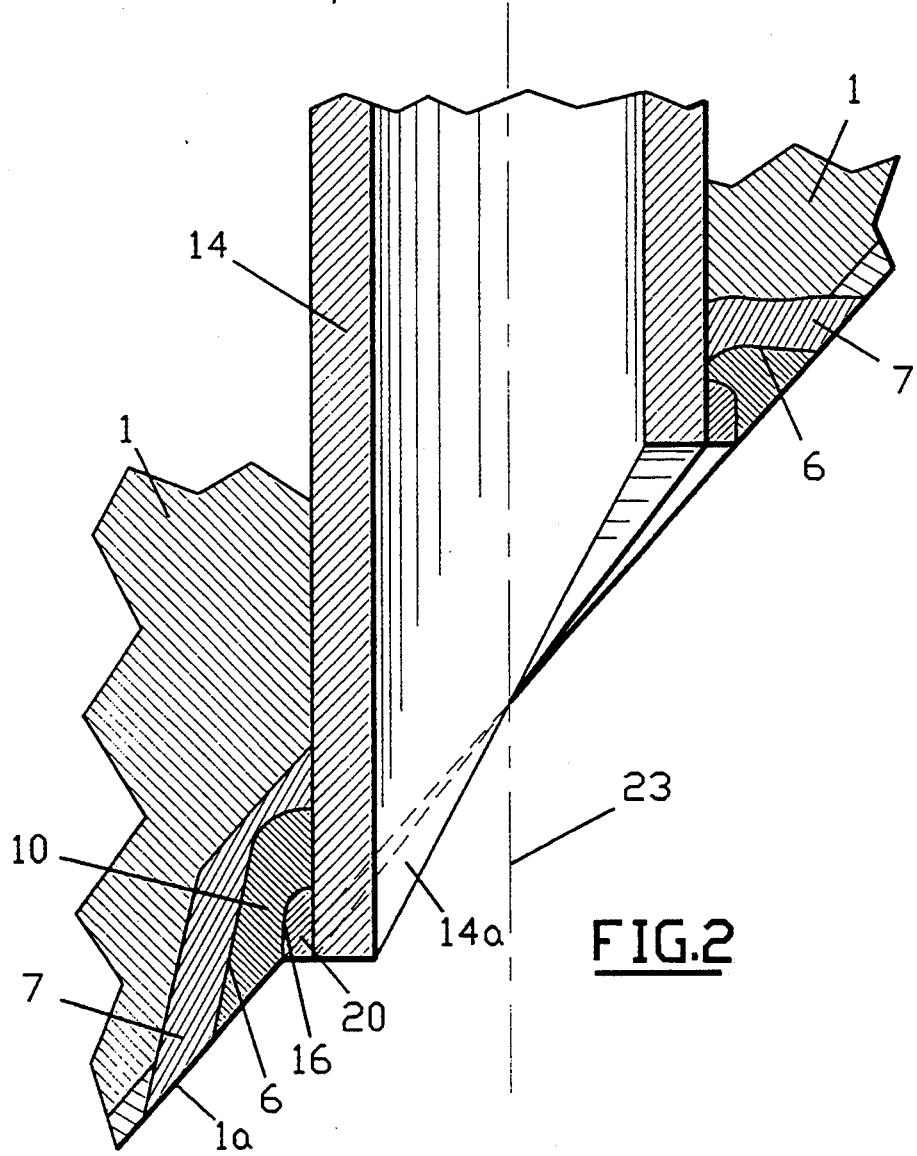
FIG. 2 is a view, in partial cross-section and on a larger scale, of the lower portion of a replacement adaptor in the vicinity of the weld for fixing onto the vessel head.

FIG. 2 represents the lower portion located in the vicinity of the lower surface 1a of the vessel head 1 of an adaptor 14 for replacing the adaptor 3.

As may be seen in FIG. 2, the surface 14a of the lower end of the adaptor has a complicated shape and a steep inclination in relation to a horizontal plane.

FIG. 2 also shows the bevel 6 in which a weld 10 is laid down, during the manufacture of the head, for fixing the original adaptor which has subsequently been replaced. The bevel 6 is formed according to a known technique in which the bevel is widened out downwards, i.e., in the direction of the lower surface 1a of the head, and has a large width in the region of this surface.

The lower surface 1a of the head 1 is covered with a cladding layer 7 made of stainless steel which also covers the bottom of the bevel 6.

In fact, the head made of low-alloy steel must be covered, over its inner surface intended to come into contact with the pressurized water of the nuclear reactor, with a corrosion-preventing stainless-steel layer. In addition, the cladding layer 7 made of stainless steel inside the bevel 6 makes it possible to improve the conditions for welding the adaptor 14, made of nickel alloy, onto the vessel head.

Figure 3:
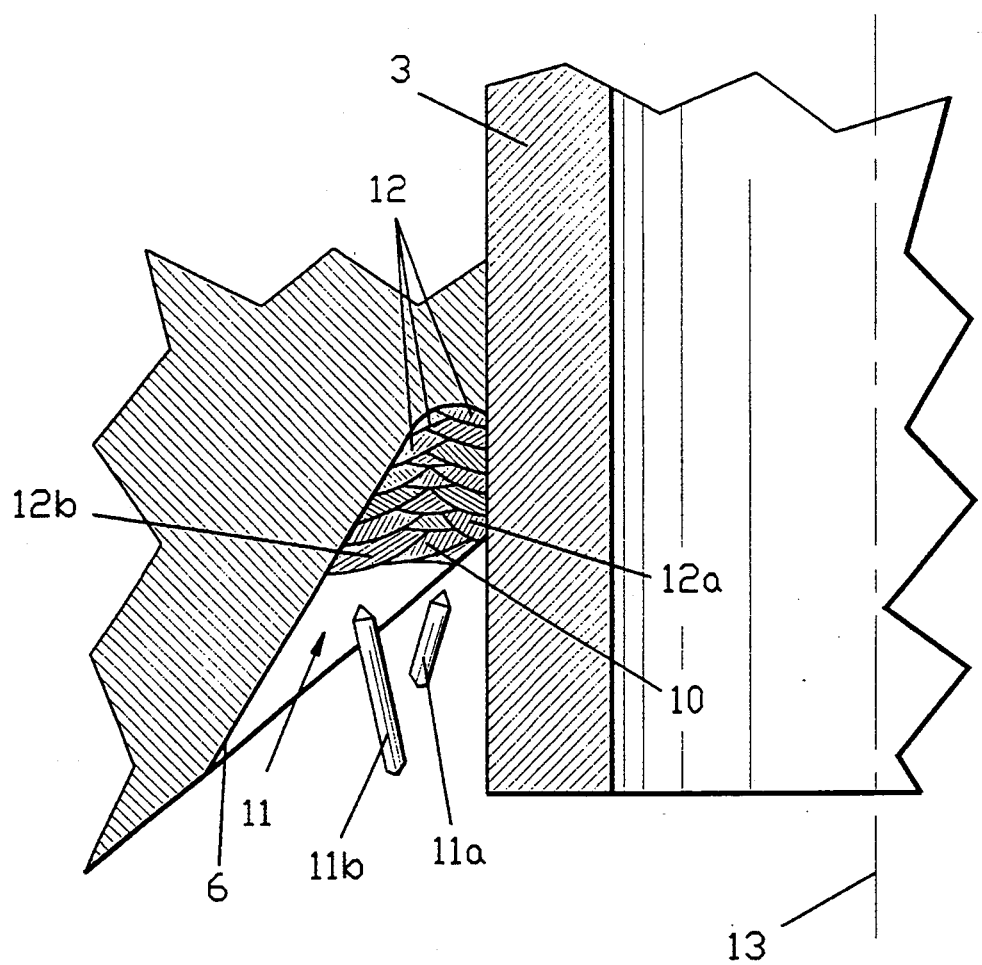
FIG. 3 is a schematic half-view, in cross-section through a vertical plane, of the weld zone of an adaptor, in the case of wide-bevel welding according to the prior art.

FIG. 3 represents the weld 10, made of filler metal, during formation inside the bevel 6 surrounding the adaptor 3, when the original adaptor 3 was fitted.

The weld 10 is formed by orbital welding using a GTAW welding head which includes a tungsten electrode 11, a device for feeding filler wire in the vicinity of the electrode and an inert-gas inlet at the end of the electrode 11, into the molten zone.

The weld 10 is constituted by weld beads 12 juxtaposed so as to constitute successive superposed weld layers, each of the weld beads 12 being formed during one revolution of the welding head which is set in rotation about the axis 13 of the adaptor 3.

In order to form the weld beads 12 under correct conditions, the inclination of the electrode 11 must be adjusted differently depending on the position of the weld bead in the bevel 6.

As may be seen in FIG. 3, in order to form the inner weld bead 12a of the final layer being laid down, the electrode must adopt a first position 11a and a first inclination, and in order to form the outer bead 12b, a second position 11b and a second inclination.

It is therefore extremely difficult to adjust the welding conditions, insofar as not only the inclination of the electrode 11 but also the inclination of the filler wire have to be adjusted differently for each of the welding passes.

Furthermore, the inclination of the electrode and of the filler wire must be adjusted not only in a transverse plane in relation to the weld bead, as represented in FIG. 3, but also in a longitudinal-direction plane in relation to the weld bead 12.

The number of successive passes necessary for forming the weld 10 may be extremely large, on account of the fact that the bevel is extensively widened towards the outside in order to allow the electrode and the filler wire to be inserted and to be oriented.

Figure 4:
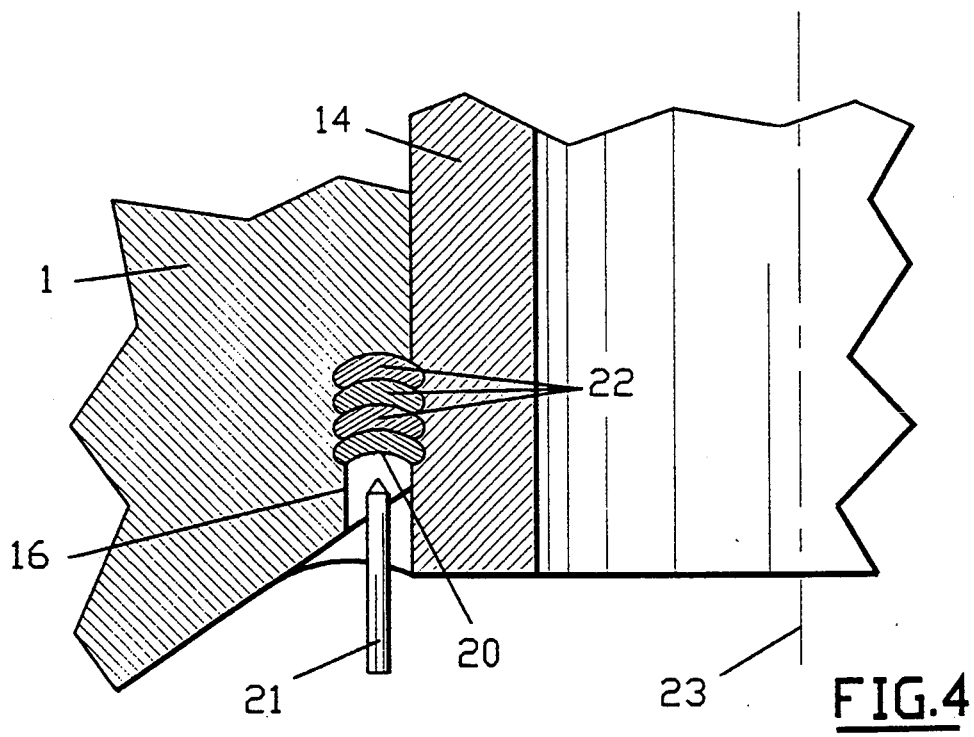
FIG. 4 is a schematic half-view, similar in FIG. 3, of the weld zone of an adaptor, in the case of narrow-bevel welding.

FIG. 4 represents an end portion of the replacement adaptor 14 which is fixed onto the vessel head 1 by means of a weld 20 made of filler metal laid down inside a narrow bevel 16 machined into the metal of the weld 10 filling in the bevel 6. The width of the bevel 16 in the radial direction of the adaptor 14 is substantially less than the width of the bevel 6 for fixing the original adaptor.

As may be seen in FIG. 4, the weld 20 made of filler metal may be formed by using an orbital welding head, which includes an electrode 21, by successively laying down superposed layers 22 of filler metal inside the bevel 16.

Each of the superposed layers 22 is constituted by a single weld bead formed during a single pass, by rotation of the welding head, which includes the electrode 21, through an angle of 360° or slightly more, about the axis 23 of the adaptor 14.

In fact, the width of the bevel 16 is sufficiently small so that each of the weld beads 22 laid down by the orbital welding head can cover the bottom of the bevel or the preceding layer over the entire width of the bevel.

The weld 20 is formed with the electrode 21 positioned parallel to the axis 23 of the adaptor 14 throughout the duration of the welding.

Likewise, the inclination of the welding wire fed to the end of the electrode 21 may be adjusted to a substantially fixed value.

However, the narrow bevel 16 has a complicated shape and a steep inclination in relation to a horizontal plane, since the bevel and the weld bead must surround the lower end of the adaptor which is an inclined skewed surface of complicated shape.

In order to obtain satisfactory welding conditions, it is necessary for the end of the electrode, into the region of which the filler wire is fed, to remain at a substantially fixed distance from the bottom of the bevel or of the preceding weld layer onto which the bead 22 is laid down.

It is also necessary for the rate at which the filler metal is laid down to be substantially constant while the orbital welding head rotates about the axis 23 of the adaptor 14.

Figure 5:
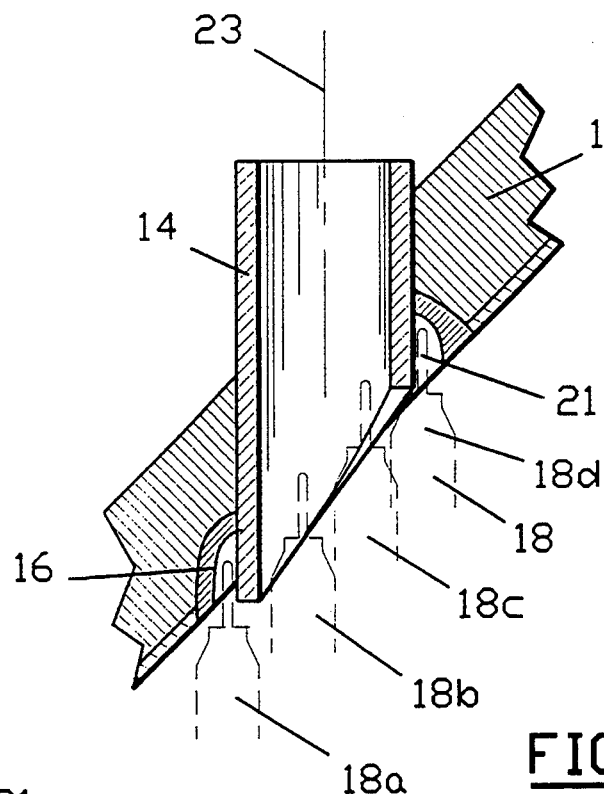
FIG. 5 is a schematic view, in cross-section, showing various positions of a welding head, during the implementation of a method according to the invention.

FIG. 5 represents various positions 18a, 18b, 18c, 18d of the orbital welding head 18, which includes the electrode 21, while it rotates about the axis 23 of the adaptor 14 in order to lay down a weld bead 22 inside the narrow bevel 16.

While it rotates, the welding head 18 must be moved in the axial direction of the adaptor, i.e., in the direction of the axis 23, so as to adjust the distance between the end of the electrode 21 and the bottom of the bevel 16 to a substantially fixed value.

This distance is adjusted by moving the welding head in order to slave the length of the arc to the welding voltage.

In order to obtain a constant welding speed, the speed of rotation of the electrode about the axis 23 of the adaptor 14 and of the bevel 16 must be modulated during one revolution of the electrode about the axis of the adaptor. In fact, the rate at which the filler metal is laid down, which corresponds to the speed of movement of the tip of the electrode in relation to the bottom of the bevel, is a combination of the speed of rotation and of the speed of translational movement in the axial direction of the welding head. This compound speed cannot be constant if the speed of rotation is maintained at a fixed value.

In the case of an adaptor such as the replacement adaptor 14 placed in a non-central position on the vessel head 15, when the electrode 21 describes a trajectory inside the bevel 16, during the orbital welding, a portion of the trajectory is raised in relation to a horizontal plane and a second portion of the trajectory is directed downwards. These two portions of the trajectory will hereinafter be designated as the rising portion and the falling portion of the trajectory of the electrode.

Figure 6:
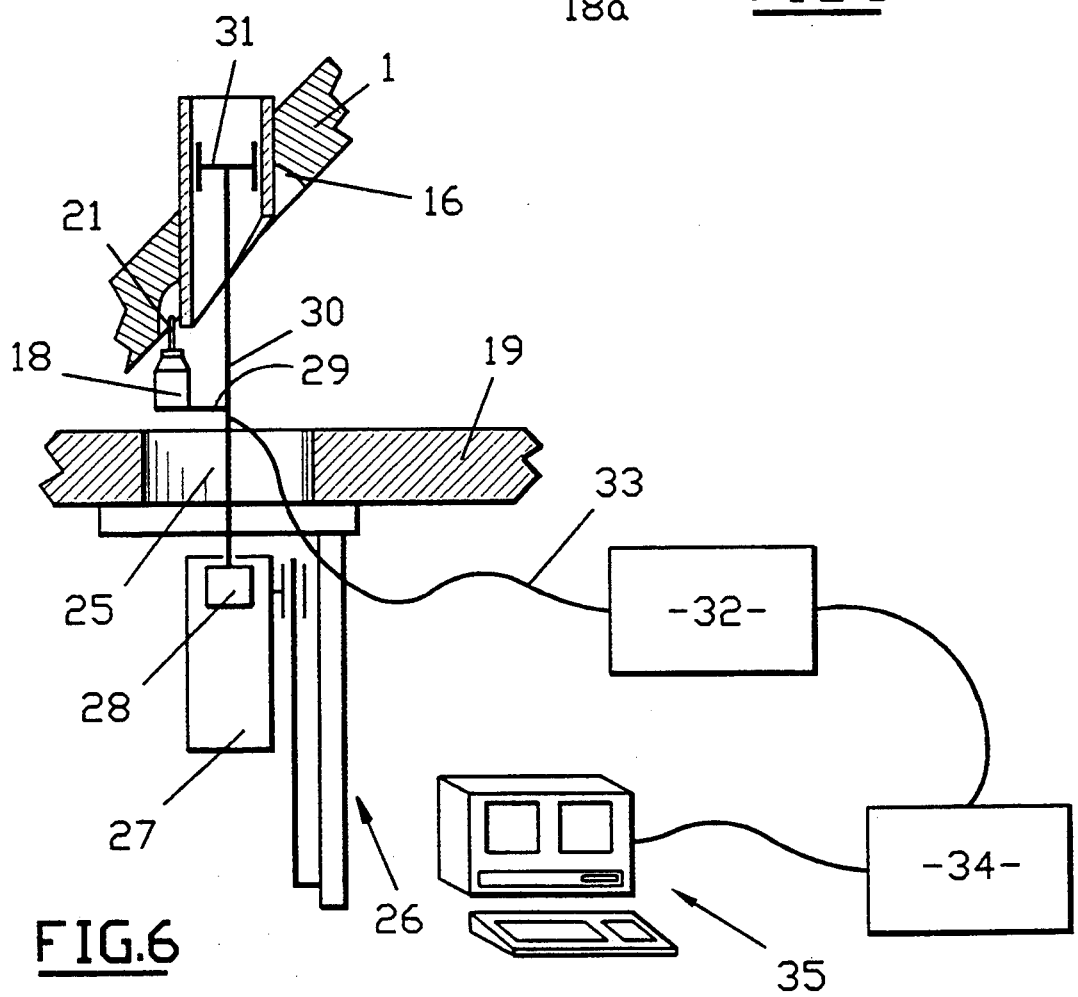
FIG. 6 is a general view of a welding installation enabling the method according to the invention to be implemented.
Figure 7:
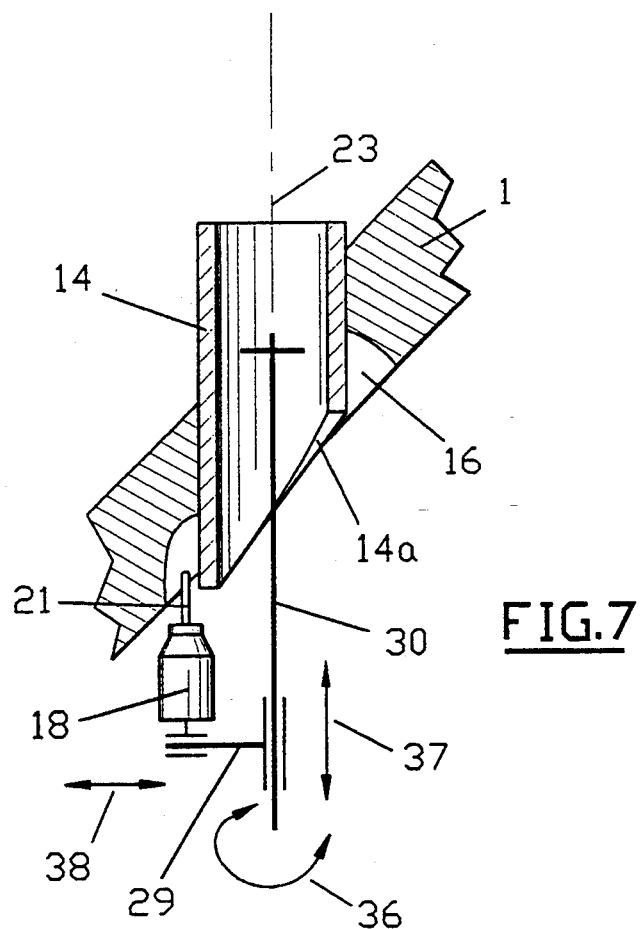
FIG. 7 is a view, on a larger scale, showing the mechanical principle for moving the welding head of the installation represented in FIG. 6.

FIGS. 6 and 7 represent a welding installation making it possible to perform the narrow-bevel orbital welding of the adaptor 14 onto the vessel head 1 of a nuclear reactor, by moving in the axial direction of the welding head 18 and by modulating the speed of rotation of this welding head about the axis of the adaptor.

The adaptor 14 is welded within the framework of an operation for replacing an adaptor having cracks which appeared in service; the lower surface of the head 1 which comes into contact with the primary coolant of the reactor in service may be highly contaminated.

The adaptor is replaced by placing the vessel head 1 on a maintenance/repair stand which includes a biological shield 19 above which the head 1 is laid down in the position shown in FIG. 1, in which the axis of the adaptors are vertical.

The biological shield 19 includes at least one opening 25 which is placed vertically below the adaptor 14 to be replaced.

The support 26 for the welding machine, which includes vertical rails for guiding a carriage 27, is fixed in the region of the opening 25.

The carriage 27 includes means for movement in the vertical direction which may be controlled, based on the welding parameters, so as to maintain a constant arc length between the electrode 21 and the bottom of the bevel 16 during the welding.

The carriage 27 carries a geared motor system 28, the shaft of which is connected to a vertical rod 30 carrying the welding head 18 by means of a horizontal support 29 of radial direction.

The geared motor 28 causes the rod 30, which is engaged in a guide bearing 31 inside the adaptor 14, to rotate about the axis 23 of the adaptor 14.

The geared motor system 28 is connected to a control unit enabling the speed of rotation to be modulated during the welding passes.

The welding installation also includes a GTAW welding generator 32 connected, via a system of cables and pipes passing through an umbilical cable 33, to the welding head 18.

The GTAW generator 32 enables the electrode to be supplied with electrical current and the inert gas to be fed into the vicinity of the tip of the electrode during the welding.

The welding head also includes two devices for feeding metal filler wire to be described hereinbelow with reference to FIG. 8.

The GTAW generator 32 is connected to a check and control unit 34 enabling the welding parameters to be adjusted and the movements of the welding head to be controlled.

A control console 35 enables an operator to monitor and to control the various passes necessary for forming the weld of the adaptor 14, by filling in the narrow bevel 16. The operator using the control console 35 is protected from radiation coming from the lower surface of the vessel head by the biological shield 19.

FIG. 7 schematically represents the various possible movements of the welding head 18. The welding head 18 is moved in rotation about the axis 23 of the adaptor 14 at a variable and adjusted speed, as shown schematically by the curved arrow 36, by means of the rod 30 which is rigidly attached to the output shaft of the geared motor 28.

Furthermore, the rod 30 and the welding head 18 move translationally in the direction of the axis 23, in one direction or the other, simultaneously with the rotation, as shown schematically by the arrow 37.

The welding head 18 is also mounted so as to move in the radial direction on the support 29, so that the radial position of the electrode 21 may be adjusted, as shown schematically by the arrow 38.

In order to lay down, during each pass, an overlapping weld bead, the welding head will rotate through an angle of at least 400° about the axis 23 of the adaptor, during one pass.

The axial translational movement, represented by the arrow 37, is generally of the order of 150 mm or more, which corresponds to the height difference between the lowest point and the highest point of the weld zone.

Figure 8:
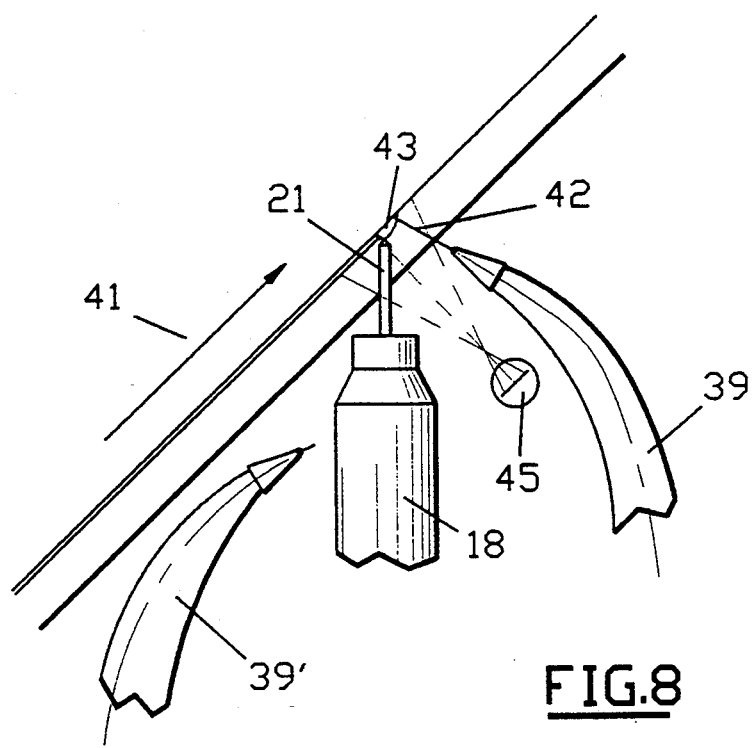
FIG. 8 is a view, in elevation and in cross-section, showing a welding head according to the invention, equipped with two wire guides.

FIG. 8 represents two wire guides 39 and 39' which are associated with the welding head 18 and arranged on either side of this welding head, in the direction of movement of the welding head in relation to the bevel, represented by the arrow 41.

The wire guides 39 and 39' are mounted so as to pivot on the support of the welding head 18 so as to move alternately between operative and non-operative positions.

In FIG. 8, the wire guide 39 is shown in operative position and the wire guide 39' in inoperative position.

The wire guide 39 enables the welding wire 42 to be progressively fed into the vicinity of the tip of the electrode 21, in the weld pool produced by the arc 43.

In the rising portion of the trajectory of the welding head 18, one of the wire guides (the wire guide 39 in the case shown in FIG. 8) is used.

When the welding head has reached the highest point and starts on the falling portion of its trajectory, the wire guide 39 is arranged so that the wire 42 reaches into the melt and weld zone beneath the electrode. The second wire guide 39' is then brought into operation.

Under these conditions, a satisfactory overhead weld is formed.

A video camera 45 fixed onto the support of the welding head 18 makes it possible to monitor the zone where the weld is formed. The image provided by the video camera appears on a screen of the control unit 35 and is used by the operator.

In the case of the welding operation which has been described above, the welding head 18 is driven in a continuous rotational motion at a variable speed with a simultaneous translational movement of the electrode 18 in the direction of the axis 23 of the adaptor.

The filler metal is laid down both in the rising portion of the trajectory of the welding head and in the falling portion, the ware guides feeding the filler metal being switched over at the lowest and highest points of the trajectory.

It is also possible to perform the welding by moving the welding head 18 in rotation in alternative directions. Starting from the lowest point of the trajectory of the welding head, a weld bead is first laid down in the rising portion of the trajectory and then the welding is interrupted in the falling portion of the trajectory. Next, the welding head is rotated in the direction opposite the previous direction, welding only in the rising portion of the trajectory.

Thus welding is performed with a welding head which includes a single wire guide feeding the metal filler wire ahead of and above the welding electrode during the rising portion of the trajectory. The head may include two symmetrical wire guides which enable each rising half-weld to be produced.

Figure 9:
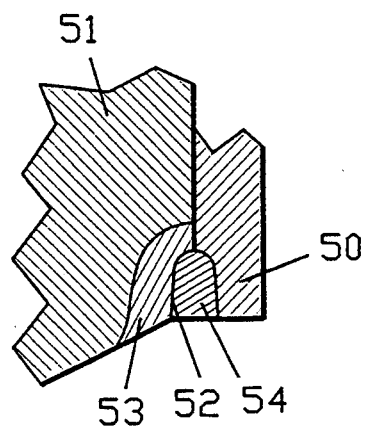
FIG. 9 is a half-view, in cross-section, of the lower portion of an adaptor fixed to the vessel head of a nuclear reactor, using an alternative embodiment of the method of the invention.

FIG. 9 represents an alternative embodiment of a narrow-bevel weld for an adaptor 50, which may be an adaptor replacing a defective adaptor, on the head 51 of the vessel of a nuclear reactor.

The narrow bevel 52, into which the weld 54 for fixing the adaptor 50 is laid down, is machined both into the original weld 53 of the adaptor to be replaced and into the outer portion of the wall of the adaptor 50.

The welding, by laying down of beads of filler metal into the bevel 52, is performed according to the method described above.

The method according to the invention therefore makes it possible to form more simply the weld for a cylindrical part such an adaptor engaged in an opening inside a curved wall. The weld produced is of very high quality and may be formed in a limited time. The mass of filler metal laid down around the part to be fixed is considerably reduced, so that the actual stresses in the joint zone of the adaptor are reduced.

In the case of an operation for replacing a defective adaptor penetrating the vessel head of a nuclear reactor with a new adaptor, the welding method according to the invention may be easily implemented on a maintenance/repair stand on which the head is placed in a position corresponding to its operative position.

The speed of rotation of the welding head may be adjusted, in any manner, as a function of the chosen welding conditions and of the movements in the axial direction of the welding head which are required by the position and orientation of the bevel.

Although the method according to the invention is particularly advantageous in the case of an operation for replacing a defective adaptor on the vessel head of a nuclear reactor, it is possible to apply the method according to the invention in other cases, for example in fixing nozzles onto an enclosure of curved shape and, more generally, for fixing any cylindrical part onto a curved wall, in the case where the axis of the cylindrical part does not pass through the center of curvature or through the axis of symmetry of the curved wall.

The invention may have numerous applications outside the field of the construction of components for nuclear reactors and may be used extensively in the heavy-boiler manufacturing industry.

We claim:

1. Method of orbital welding of a cylindrical part onto a curved wall, said curved wall comprising a through-opening in which said cylindrical part is engaged, said method comprising the steps of
   (a) providing a bevel surrounding said cylindrical part engaged into said through-opening;
   (b) moving a welding head comprising an electrode and a metal filler wire in rotation about an axis of said cylindrical part; and,
   (c) laying down in said bevel a filling metal obtained by melting said metal filler wire with the aid of said electrode while moving said welding head, said bevel having a width in a direction perpendicular to said axis of said cylindrical part, such that said filling metal is laid down in the form of superposed layers each covering an entire width of said bevel, and further comprising, during each turn of the rotations of said welding head;
   (d) keeping said electrode continuously in a direction parallel to said axis of said cylindrical part;
   (e) moving said welding head translationally in the direction of said axis of said cylindrical part; and
   (f) varying a speed of rotation of said welding head and regulating said speed so as to obtain a constant linear speed of laying down of said filling metal along said bevel.

2. Method according to claim 1, comprising feeding said metal filler wire continuously into a weld pool produced by an arc emanating from said electrode.

3. Method according to either of claims 1 and 2, wherein said curved wall is a spherical-cap-shaped nuclear reactor vessel head including a vertically extending axis passing through a top of said vessel head and said cylindrical part is a tubular adaptor penetrating said vessel head at a location other than said top of said vessel head, orbital welding being carried out in a bevel located in the region of a concave lower wall of said vessel.

4. Device for the orbital welding of a cylindrical part onto a curved wall, in a region of a through-opening penetrating said wall in which said cylindrical part is engaged, said device comprising
   (a) a welding head which includes a welding electrode;
   (b) at least one device for feeding wire-shaped filler metal;
   (c) means for moving said welding head in rotation about an axis of said cylindrical part;
   (d) means for moving said welding head translationally in the direction of said axis of said cylindrical part; and
   (e) control and adjustment means for adjusting a speed of rotation of said welding head and for controlling translational movement of said welding head in the direction of said axis of said cylindrical part, during rotational movement of said welding head in such a way that a linear speed of said welding head with respect to said cylindrical part and curved wall is kept constant.

5. Device according to claim 4, including two devices for feeding wire into the vicinity of the electrode, said devices being equipped with means for moving them between operative and inoperative positions.

* * * * *